(12) United States Patent
Parker

(10) Patent No.: US 8,494,560 B2
(45) Date of Patent: Jul. 23, 2013

(54) SYSTEM, METHOD AND PROGRAM PRODUCT FOR LOCATION BASED SERVICES, ASSET MANAGEMENT AND TRACKING

(76) Inventor: Lansing Arthur Parker, Los Angeles, CA (US)

(*) Notice: Subject to any disclaimer, the term of this patent is extended or adjusted under 35 U.S.C. 154(b) by 146 days.

(21) Appl. No.: 12/362,697

(22) Filed: Jan. 30, 2009

(65) Prior Publication Data

US 2010/0130233 A1 May 27, 2010

Related U.S. Application Data

(60) Provisional application No. 61/117,933, filed on Nov. 25, 2008.

(51) Int. Cl.
 *H04W 4/02* (2009.01)
(52) U.S. Cl.
 USPC ........ 455/456.3; 455/417; 455/558; 709/206; 342/357.37
(58) Field of Classification Search
 USPC .............. 455/456.2, 433, 410, 417, 406, 458, 455/557, 404, 435.1, 445, 456.5; 709/206; 701/13; 342/357.37
See application file for complete search history.

(56) References Cited

U.S. PATENT DOCUMENTS

| | | | |
|---|---|---|---|
| 2002/0055852 A1* | 5/2002 | Little et al. ........................ 705/1 |
| 2002/0160766 A1* | 10/2002 | Portman et al. ............... 455/422 |
| 2003/0036379 A1* | 2/2003 | Nikolai et al. ................ 455/414 |
| 2003/0088517 A1* | 5/2003 | Medoff .......................... 705/59 |
| 2003/0114191 A1* | 6/2003 | Nishimura .................... 455/557 |
| 2004/0023666 A1* | 2/2004 | Moon et al. ............... 455/456.1 |
| 2004/0166879 A1* | 8/2004 | Meadows et al. .......... 455/456.1 |
| 2005/0202817 A1* | 9/2005 | Sudit ............................. 455/433 |
| 2005/0280557 A1* | 12/2005 | Jha et al. ....................... 340/988 |
| 2007/0063853 A1* | 3/2007 | Derrick et al. ............. 340/573.4 |
| 2007/0072620 A1 | 3/2007 | Levitan |
| 2007/0077912 A1* | 4/2007 | Mahajan ....................... 455/410 |
| 2007/0218891 A1* | 9/2007 | Cox ........................... 455/422.1 |
| 2008/0070593 A1 | 3/2008 | Altman |

* cited by examiner

*Primary Examiner* — Mahendra Patel

(57) ABSTRACT

A system for location based services utilizing a mobile device includes a software module configured to operate in a background mode on the mobile device. The software module is further configured to determine a geographical location of the mobile device and transmit the geographical location at predetermined intervals. A services platform is in communication with the mobile device for receiving the geographical location. The services platform includes at least one location based service module for facilitating at least one location based service on the mobile device. A plurality of back end databases is in communication with the services platform where the services platform integrates data from the back end databases with data from a location database. A secure website is included where an owner of the mobile device can view the geographical location of the mobile device and geographical locations of other mobile devices and have the ability to view friends/family/business associates on their mobile device.

28 Claims, 4 Drawing Sheets

SYSTEM, METHOD AND PROGRAM PRODUCT FOR LOCATION BASED SERVICES, ASSET MANAGEMENT AND TRACKING

CROSS-REFERENCE TO RELATED APPLICATIONS

The present Utility patent application claims priority benefit of the U.S. provisional application for patent Ser. No. 61/117,933 filed on Nov. 25, 2008 under 35 U.S.C. 119(e). The contents of this related provisional application are incorporated herein by reference for all purposes.

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office, patent file or records, but otherwise reserves all copyright rights whatsoever.

FIELD OF THE INVENTION

The present invention relates generally to mobile applications. More particularly, the invention relates to location-based services for mobile devices.

BACKGROUND OF THE INVENTION

There are currently 3.3 billion cell phones in the world, and the growth in cell phone ownership is not stopping. Portio Research predicts that 50% of the world's population will be using a cell phone by the end of 2009. Furthermore, cell phones are becoming more sophisticated with many different types of applications including, but not limited to, location-based services (LBS). A location-based service is an information or entertainment service accessible with mobile devices through a mobile network utilizing the ability to make use of the geographical position of the mobile device. The geographical positions of these mobile devices are typically determined for location-based services using global positioning systems (GPS) and cell phone tower triangulation, and in the U.S., every cell phone produced after 2006 is required to be GPS enabled. Location-based services is a huge market and many companies are looking at how they can provide these services. Various types of location-based services may be useful or appealing to cell phone users or service providers.

One such location-based service is a phone locator service. Losing a cell phone is a costly annoyance. Currently people are reliant on their phones more than ever, and cell phones often hold a large amount of information that can be sensitive, important and private to its owner. Furthermore, the cost of some of these devices has risen to $500-600. Approximately 20% of mobile subscribers in the U.S. have insurance on their cell phone that costs about $5 a month. When an insured subscriber loses a phone, they typically have to pay a $50 deductible. One of the top insurers in Los Angeles County replaces 400,000 lost or stolen phones a month. There is a tremendous need to help consumers locate lost and stolen cell phones to avoid paying for replacement phones.

A currently known solution for finding stolen cell phones sends a text message or email with the number of the thief if the thief switches the Subscriber Identity Module (SIM) card in the stolen phone. However, this solution does nothing if the SIM card is not changed. Other known solutions use GPS to track the location of cell phones. However, these solutions only track the location of the phone if the location software is turned on. This would enable a thief to turn off the software so that the phone could not be located. It would be highly desirable to have a novel method that could still locate the phone without the thief being aware of it. There are also several companies that currently provide 'over the air' contact backups automatically from a cell phone. However, these backups offer nothing to recover the phone if lost or stolen.

Another location based service that may be useful to cell phone users is a friends and family locator that enables a user to view the locations of friends and family members who also have the application on their cell phones. A currently known friends and family locator is provided by Loopt mobile. However, this method requires the application to be opened on the phone and only sends the recent location of the phone every 15 minutes to 2 hours. Furthermore, if the application is turned off completely, the current location information for the phone is removed from the system, location updating is suspended and the current location is no longer available to others using the application. Also, if the application is not used for a predetermined period of time by actually bringing the application to the foreground, location updating times out and the location information for the phone expires. Verizon also has a location product called 'Chaperone'; however, this product requires the user to purchase a specific handset for this service, and this service is only available on a very limited number of handsets. Also, this product is geared mainly toward child protection.

In view of the foregoing, there is a need for improved techniques for providing location-based services for cell phones and other mobile devices that do not require an application to be running in the foreground in order to function and frequently update the location of the cell phones.

BRIEF DESCRIPTION OF THE DRAWINGS

The present invention is illustrated by way of example, and not by way of limitation, in the figures of the accompanying drawings and in which like reference numerals refer to similar elements and in which.

SUMMARY OF THE INVENTION

Figure 1:
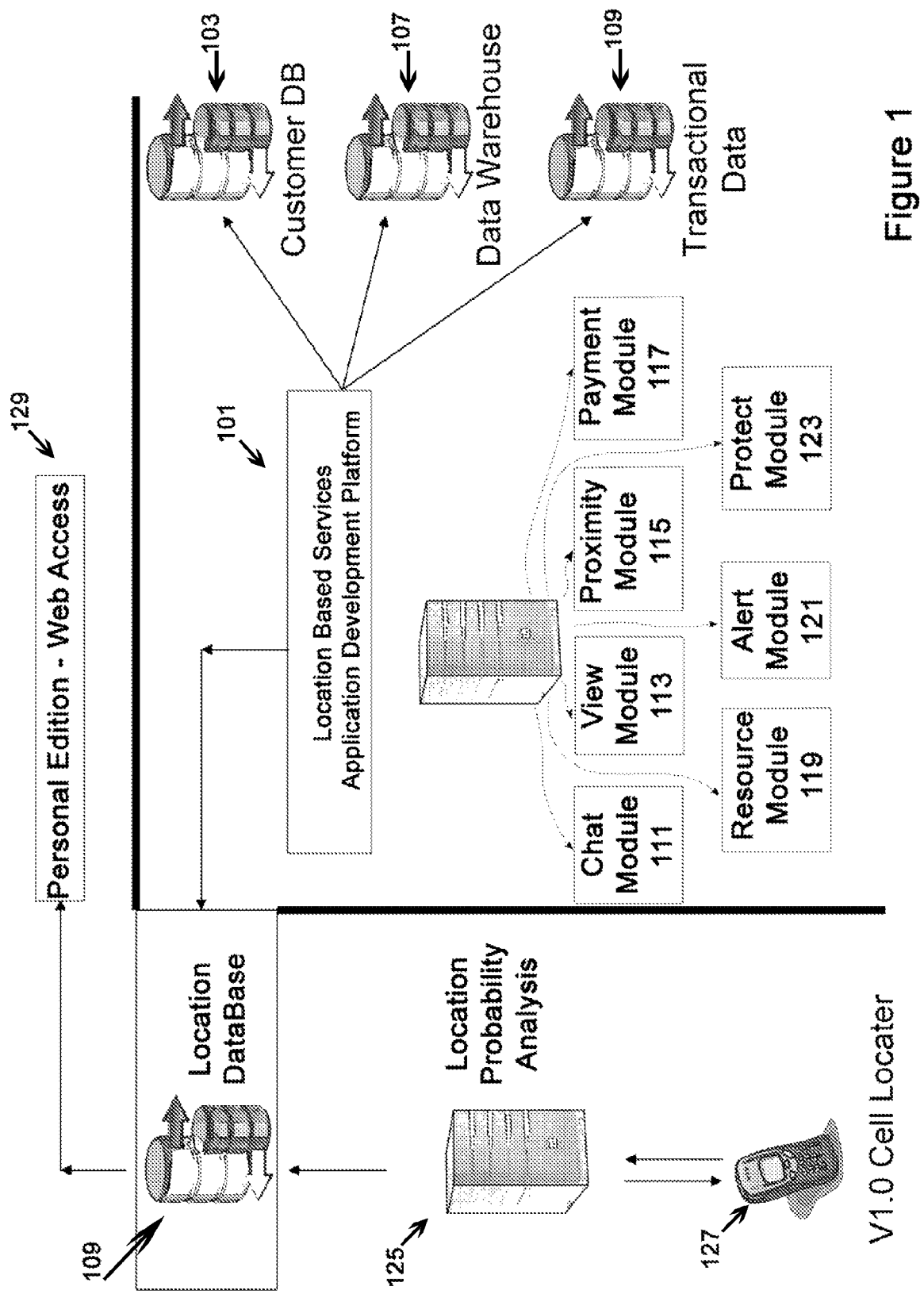
FIG. 1 illustrates the architecture of an exemplary system for providing location-based services to mobile devices, in accordance with an embodiment of the present invention.

To achieve the forgoing and other objects and in accordance with the purpose of the invention, system, method and program product for location based services, asset management and tracking is presented.

In one embodiment, a system for location based services utilizing a mobile device is presented. The system includes a software module configured to operate in a background mode on the mobile device. The software module is further configured to determine a geographical location of the mobile device and transmit the geographical location at predetermined intervals. A services platform is in communication with the mobile device for receiving the geographical location. A location database is included where the services platform stores the geographical location. A secure website is included where an owner of the mobile device can view the geographical location of the mobile device thereby aiding the owner in locating a lost or stolen mobile device. In another embodiment the software module is further configured to suspend transmitting the geographical location when it is determined that the geographical location is unchanged from a previous geographical location to generally reduce bandwidth, and server and database processing requirements, and resume transmitting the geographical location when it is determined that the geographical location is changed from the previous geographical location. In another embodiment the software module is further configured to detect a change in identity of the mobile device and transmit the change in identity and a current geographical location upon the detection. In yet another embodiment the software module is further configured to detect a battery depletion in the mobile device, detect attempts to tamper with the mobile device and transmit a current geographical location upon the detection of battery depletion or the detection of attempts to tamper. In still another embodiment the software module is further configured to activate at least one feature of the mobile device upon receiving instructions from the owner using the secure website. In another embodiment the owner can further view geographical locations of other mobile devices hosting the software module in use by individuals allowing the viewing by the owner. In yet another embodiment the services platform includes at least one location based service module for facilitating at least one location based service on the mobile device. Another embodiment further includes a plurality of back end databases in communication with the services platform where the services platform integrates data from the back end databases with data from the location database. In another embodiment, at least one location based service module includes a functionality to allow the owner to open a dialog with another user based on the geographical location. In yet another embodiment, at least one location based service module includes a functionality to allow the owner to receive information based on the geographical location. In still another embodiment the at least one location based service module includes a functionality to allow the owner to locate another user based on the geographical location. In another embodiment, at least one location based service module includes a functionality to allow the owner to render payment for goods or services based on the geographical location. In still another embodiment, at least one location based service module includes a functionality to allow the owner to receive informational alerts based on the geographical location. In yet another embodiment, at least one location based service module includes a functionality to compare a location of an alleged financial transaction of the owner to the geographical location. Still another embodiment further includes a commerce website where the owner can locate or be alerted of buyers and sellers based on the geographical location.

In another embodiment a system for location based services utilizing a mobile device is presented. The system includes means for determining and transmitting a geographical location of the mobile device, means for communicating with the mobile device to receive the geographical location, means for storing the geographical location and means for an owner of the mobile device to view the geographical location. Another embodiment further includes means for facilitating at least one location based service on the mobile device. Other embodiments further include means for integrating data from the storing means and means for facilitating commerce based on the geographical location.

In another embodiment a method for location based services utilizing a mobile device is presented. The method includes the steps of determining a geographical location of the mobile device, transmitting the geographical location to a services platform for storage in a location database and viewing the geographical location of the mobile device thereby aiding an owner in locating a lost or stolen mobile device. In another embodiment the step of transmitting further includes suspending transmitting of the geographical location when it is determined that the geographical location is unchanged from a previous geographical location to generally reduce bandwidth, and server and database processing requirements, and resuming transmitting of the geographical location when it is determined that the geographical location is changed from the previous geographical location. Another embodiment further includes the step of detecting a change in identity of the mobile device and transmitting the change in identity and a current geographical location upon the detection. Yet another embodiment further includes the step of detecting a battery depletion in the mobile device, detecting attempts to tamper with the mobile device and transmitting a current geographical location upon the detection of battery depletion or the detection of attempts to tamper. Still another embodiment further includes the step of activating at least one feature of the mobile device upon receiving instructions from the owner using a secure website. Yet another embodiment further includes the step of viewing geographical locations of other mobile devices of individuals allowing the viewing. Another embodiment further includes the step of interacting with at least one location based service associated with the services platform where the services platform integrates data from back end databases with data from the location database. Yet another embodiment further includes the step of opening a dialog with another user using the at least one location based service. Still another embodiment further includes the step of receiving information based on the geographical location from the at least one location based service. Yet another embodiment further includes the step of locating another user using the at least one location based service. Another embodiment further includes the step of rendering payment for goods or services using the at least one location based service. Still another embodiment further includes the step of receiving informational alerts from the at least one location based service. Yet another embodiment further includes the step of receiving from the at least one location based service a result of a comparison of a location of an alleged financial transaction of the owner to the geographical location. Another embodiment further includes the step of using a commerce website where the owner can locate or be alerted of buyers and sellers based on the geographical location.

In another embodiment a method for location based services utilizing a mobile device is presented. The method includes steps for determining a geographical location of the mobile device, steps for transmitting the geographical location to a services platform and steps for viewing the geographical location of the mobile device and other mobile devices. Another embodiment further includes steps for detecting changes in the mobile device. Yet another embodiment further includes steps for activating at least one feature of the mobile device. Other embodiments further include steps for interacting with at least one location based service and steps for using a commerce website.

In another embodiment a computer program product for location based services utilizing a mobile device is presented. The computer program product includes computer code for determining a geographical location of the mobile device and transmitting the geographical location to a services platform for storage in a location database. The computer code suspends transmitting of the geographical location when it is determined that the geographical location is unchanged from a previous geographical location to generally reduce bandwidth, and server and database processing requirements, and resumes transmitting of the geographical location when it is determined that the geographical location is changed from the previous geographical location. Computer code detects changes in the mobile device and transmits the geographical location upon the detecting. Computer code activates at least one feature of the mobile device a web site. Computer code interacts with at least one location based service. Computer code is included for viewing the geographical location of the mobile device and other mobile devices. A computer-readable medium stores the computer code.

In another embodiment a system for location based services utilizing a mobile device is presented. The system includes a software module configured to operate in a background mode on the mobile device. The software module is further configured to determine a geographical location of the mobile device and transmit the geographical location at predetermined intervals. The software module is further configured to suspend transmitting the geographical location when it is determined that the geographical location is unchanged from a previous geographical location to generally reduce bandwidth, and server and database processing requirements, and resume transmitting the geographical location when it is determined that the geographical location is changed from the previous geographical location. A services platform is in communication with the mobile device for receiving the geographical location. The services platform includes at least one location based service module for facilitating at least one location based service on the mobile device. A location database is included where the services platform stores the geographical location. A plurality of back end databases is in communication with the services platform where the services platform integrates data from the back end databases with data from the location database. A secure website is included where an owner of the mobile device can view the geographical location of the mobile device and geographical locations of other mobile devices hosting the software module in use by individuals allowing the viewing by the owner. A commerce website is included where the owner can locate or be alerted of buyers and sellers based on the geographical location.

Other features, advantages, and object of the present invention will become more apparent and be more readily understood from the following detailed description, which should be read in conjunction with the accompanying drawings.

DETAILED DESCRIPTION OF THE PREFERRED EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

The present invention will now be described in detail with reference to embodiments thereof as illustrated in the accompanying drawings.

Preferred embodiments of the present invention provide means and methods for providing location-based services as mobile applications on cell phones and other mobile devices. The software for preferred embodiments is coded for all mobile phone operating systems including, but not limited to, Symbian, Windows Mobil, Brew, iPhone, Android, and Blackberry. In preferred embodiments the location data of each mobile device in the system is kept in a central secure database unique to this system. The location data in this database may then be used to provide location based services such as, but not limited to, locating lost or stolen cell phones, locating friends or family members, location-based social networking and dating, providing location specific advertising, etc. Preferred embodiments of the present invention also enable companies or any individual to provide their own location based services. In preferred embodiments, the solution (i.e., the software and hardware) is architected to accommodate 500,000 users; however, alternate embodiments may be scaled to millions of users effectively.

There are various types of location-based services that may be provided by preferred embodiments of the present invention. For example, without limitation, one type of location-based service is a proximity-based notification. Proximity-based notifications may include, without limitation, location-based targeted advertising, mobile location-based social networking, mobile location-based dating, etc. A non-limiting example of location-based targeted advertising is, when a user of a location-based service walks near a store, the user gets a message to receive 20% off a purchase at that store. In a non-limiting example of mobile location-based social networking, the system may integrate with Linked-In, Myspace and/or Facebook to notify users when they are near friends. Mobile location-based dating may integrate with various dating services such as, but not limited to, Match.com, etc. Another type of location-based service is a proximity-based actuation. Proximity-based actuations may include, without limitation, payment based upon proximity, for example, without limitation, a toll or any other payment, automatic airport check-in, activating a smart house when in close proximity. Another type of location-based service is finding someone or something for example, without limitation, a person by skill (i.e., a doctor), a business, weather, emergency 911, a taxi, food delivery, etc. Parents may also use this type of location-based service to know where their children are or to determine if their children are in the proximity of a felon or child molester. Another type of location-based service is resource tracking. For example, without limitation, a business owner may track his resources such as, but not limited to, taxis, service people, rental equipment, fleet management and scheduling. Another type of location-based service is an alert such as, but not limited to, an alert of traffic accidents, an alert of a hurricane or tornado warning area or an area of a predicted earthquake, recent crime reports in a particular neighborhood, etc. Alerts may also provide information to users. In a non-limiting example, a user may stand next to a house recently sold or for sell and be notified of its purchase price or listing price or the previous selling price of that particular house or ones nearby. Another type of location-based service is a location-based chat. In a non-limiting example of a location-based chat, a user in a store and may receive help through chat on a cell phone as he shops, and the chat ends when the user leaves the store.

Location Based Services is a huge market and the approaches provided by preferred embodiments of the present invention offer companies an easy way to provide location-based services to their customers. Furthermore, location-based service providers will be able to generate revenue from location-based text message ads to users and ads on the websites associated with the location-based services. The use of location-based services according to preferred embodiments will enable companies to provide more timely text messages and location-based marketing services that are much more relevant to the user.

FIG. 1 illustrates the architecture of an exemplary system for providing location-based services to mobile devices, in accordance with an embodiment of the present invention. In the present embodiment, a location-based services application development software platform 101 of the system may be installed on a server of an entity such as, but not limited to, a company or a government agency. Once installed, location-based services platform 101 integrates with back end data of the entity where the software is installed including, but not limited to, a customer database 103, a data warehouse 105 and a transactional data database 107. This integrates the internal data and customer information of the entity with location data from location-based services platform 101, bridging the gap between the detailed customer data from the entity and where the customers are located. This integration enables the system to have a much deeper understanding and viewpoint of the kinds of location-based services it can provide to customers and is important for providing richer and meaningful alerts and communications to the individuals based on location. For instance, without limitation, providing better marketing based on what customers have previously purchased or providing weather data to notify those who may be entering a tornado warning area, etc.

Location-based services platform 101 collects geographical location information about users in a private central location database 109 as the software on a user's cell phone or other type of mobile device sends its location using GPS or cell phone tower triangulation to location-based services platform 101 at a configurable interval, for example, without limitation, every 5-30 seconds, every minute or every five minutes. This geographical information is the geographical location of the user's cell phone or other mobile device. In the present embodiment, location database 109 is in a central location where the entity using the system records and owns location database 109. It is contemplated that in many applications the service provider would own the location data and offer consumers access or use thereof by way of the software platform developed by the provider and installed by the consumer. However, an alternate embodiment comprises an alternative architecture where each entity that uses enterprise location-based services platform 101 has its own location database on its own site that stores the location of people that have downloaded the mobile application software. In yet another embodiment, location database 109 is owned by the administrator of location-based services platform 101, giving them use of, not ownership of, the data of where the customers are located in virtual real time. In other embodiments system may employ Enterprise Application and Data Integration and Data Quality applications currently available in the market from companies such as, but not limited to, Information Builders, Informatica, Tibco, and Teradata.

In the present embodiment, location-based services platform 101 is able to send messages to users through their mobile devices, and users may set LBS preferences on their mobile devices to receive messages from particular location based modules. These preferences may include, without limitation, how often they would like to be alerted and type of information such as, but not limited to, cars, houses, CD's from music stores, etc. Software platform 101 searches location database 109 for users who are in certain areas based on the location data and the particular module used to perform location-based services.

In the present embodiment, location-based services platform 101 comprises the following modules a chat module 111, a proximity module 113, a view module 115, a payment module 117, a resource module 119, an alert module 121, and a protect module 123. Those skilled in the art, in light of the present teachings, will readily recognize that various different modules may be included in alternate embodiments including, but not limited to, Mobile Customer Relationship Management, emergency services, activating your smart house, etc. (the idea that many different modules can be developed for the enterprise software that utilize the location data and customer information to provide the multitude of location based services). Chat module 111 enables users to open a dialogue with any other user based on location. Chat module 111 may be used to provide services such as, but not limited to, a location-based customer service chat, a service enabling users to talk to friends, a service connecting sellers and buyers in particular locations, etc. Proximity module 113 provides information to users based on the geographical location of the users. Services that may be provided by proximity module 113 include, without limitation, location-based advertising, automatic airport check in, activating a smart house, retrieving crime reports for an area, retrieving home prices, ordering a taxi, etc. View module 115 enables users to view where other users are located. In some embodiments, the view module 115 may provide users with a view of fixed locations, as for example, without limitation, businesses or landmarks. Services that may be provided by view module 115 include, without limitation, a service for finding friends, a mobile dating service and a social or business networking service. Payment module 117 enables users to pay for anything using a mobile device. Resource module 119 enables users to track resources such as, but not limited to assets, employees, children, fleet vehicles, rental cars, etc. Alert module 121 provides important information and alerts based on geographic location such as, but not limited to, traffic accidents, weather warnings, earthquake warnings, notification if a user's children are near a criminal, etc. Protect module 123 generally prevents credit card or financial fraud by matching the geographic location of a user with the location of a purchase or other activity involving the user's credit card or bank account. If the location of the user as indicated in location database 109 is not the same as the location of the purchase or account activity, the chance of fraud is much higher. Furthermore, companies who have installed location-based services platform 101 may make their own LBS applications for their customers such as, but not limited to, providing information, marketing, alerts, service, and entertainment. In various embodiments, the system is able to, through real time data integration, data quality, and business to business integration, create a customer record in real time from all user activities with the participating entities. The system then can perform statistical analysis on the probability that a user will respond favorably to, without limitation, certain messages, information, alerts, location-based marketing, etc.

In an effort to optimize response rates, enhance the end user experience and dramatically reduce unwanted messages, a location probability analysis (LPA) server 125 codes probability analysis algorithms and artificial intelligence to send the right marketing messages to the right people at the right time based on their location, time and date. After processing the location probability information, LPA server 125 stores this information in location database 109. In a non-limiting example, the LPA server 125, where appropriate, may predict if the end user is likely to respond to a location based marketing message for example. In some instances this prediction would not be needed if the system is alerting the end user of entering into an area such as, but not limited to, a tornado area, earthquake area, etc.

The present embodiment comprises a mobile device locator service in which the software on a cell phone 127, or other type of mobile device, sends its location to location-based services platform 101 at a configurable interval, for example, without limitation, every 5-30 seconds. The location data for cell phone 127 is stored in location database 109 in a proprietary and secure fashion. The location of cell phone 127 can be viewed via a map on a secure website. In order to view the secure website, the user must enter a username and password. Furthermore, from the secure website, the owner of cell phone 127 can perform various functions on cell phone 127 including, but not limited to, activating a key lock feature of cell phone 127, erasing all private/personal data, backing up all information from the mobile device to the central database, placing a phone call, taking a picture, video or voice recording and emailing it or sending an MMS message to any email address or phone number of their choice. Alternate embodiments may be implemented without a mobile device locator service.

The present embodiment also comprises an individual website 129 that enables anyone to perform location-based services. For example, without limitation, users of website 129 may be buyers and sellers of various items. In this example, users enter information on website 129 about the items they want to sell or what they want to buy along with a distance threshold. When a buyer and a seller match the criteria of what they are looking to sell or buy and are both within the proper distance threshold of each other, a message is sent to the mobile devices for both the seller and the buyer. The users may then open a chat or call each other to possibly make a transaction. Website 129 of location-based services platform 101 integrates location and time in the matching up of buyers and sellers for specific products any where in the world. Users of website 129 may also provide various other types of location-based services such as, but not limited to, social networking, posting personal ads, selling their car, house, or any item for that matter. This would allow the users to be location and proximity specific. Alternate embodiments may comprise a website enabling users to perform their own location-based services.

In some embodiments, location-based services platform 101 may be integrated with business intelligence solutions, and data quality providers such as, but not limited to, Cognos (IBM), Microstrategy, Information Builders, Business Objects/SAP, Teradata, Informatica, Hyperion/Oracle, SPSS, etc. Also in some embodiments, location-based services platform 101 may be integrated with other data integration/enterprise application integration solution providers such as, but not limited to, BEA/Oracle, Web Methods/Software AG, Websphere/IBM, Teradata, Informatica, Tibco and Information Builders. This enables location-based services platform 101 to leverage technology that has been developed and perfected rather than building new integration in to all of the different databases in the system. This integration allows for the system to integrate customer location information with all the other information data entities have about the customer. It creates a virtual real time "golden record" of each customer. In a non-limiting example, the system would know the products the customer has purchased, what stores the customer frequents, etc. and be able to provide true one to one marketing and information based on location while providing that information at the right and relevant time. However, in alternate embodiments new integration may be built into the databases of the system rather than using pre-existing integration solutions.

Figure 2:
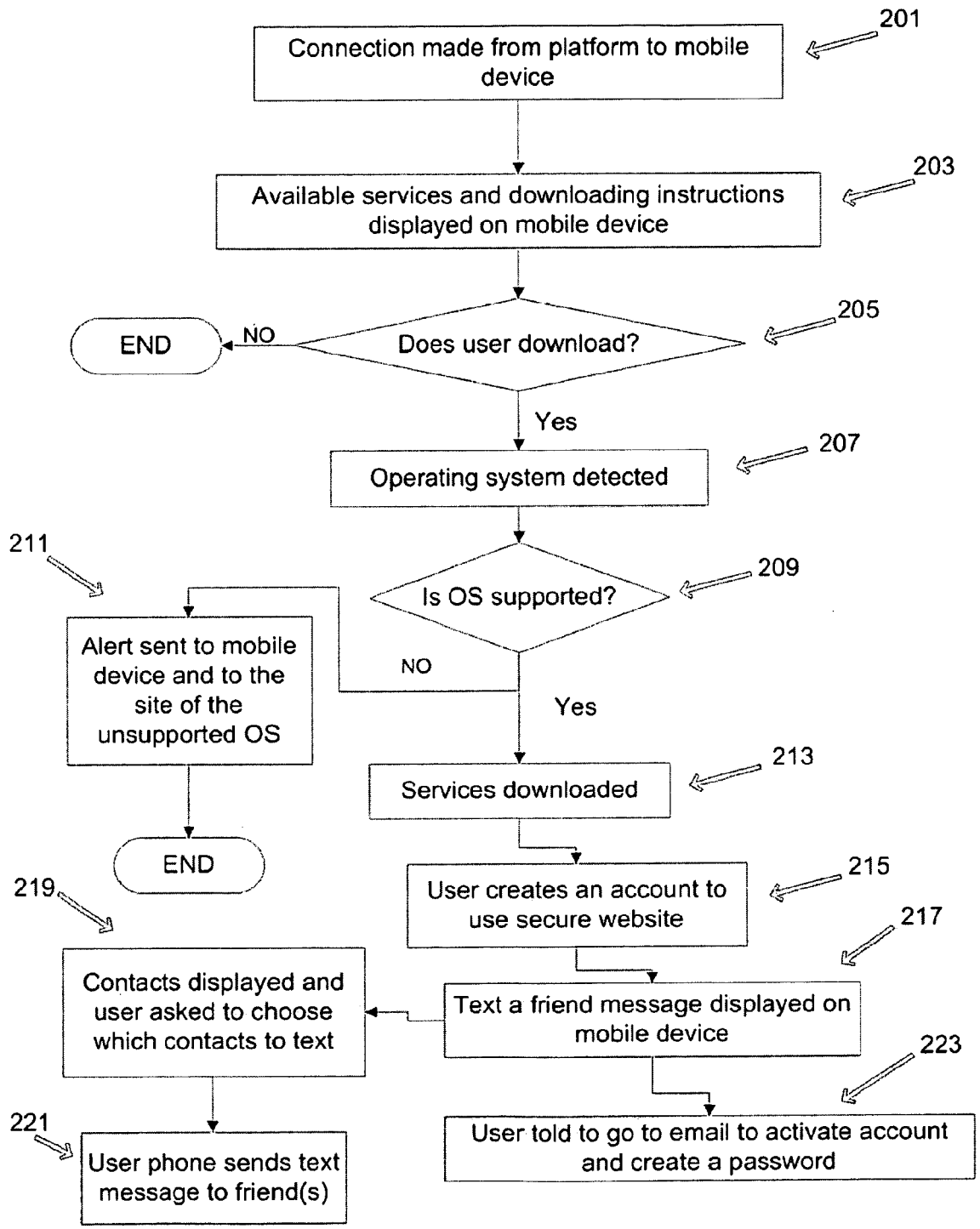
FIG. 2 is a flow chart illustrating an exemplary process for signing up for a location-based service provider, in accordance with an embodiment of the present invention.

FIG. 2 is a flow chart illustrating an exemplary process for signing up for a location-based service provider, in accordance with an embodiment of the present invention. In the present embodiment, the process begins at step 201 where a connection is made from a location-based services platform to a mobile device, for example, without limitation, an over the air (OTA), universal serial bus (USB), Bluetooth or infrared (IR) connection. In a non-limiting example, a user would be able to install the software from a mobile device via Bluetooth. That is, if the software is installed on a friend's mobile device, the user can connect to his friend's phone and receive the software or begin the installation process from him through the Bluetooth connection. Through this connection the services available to the user from the location-based services platform and instructions on how to download the services are displayed on the screen of the mobile device in step 203. The process determines if the user chose to download the services in step 205. If not, the process ends. If so, the location-based services platform auto-detects the operating system (OS) on the mobile device in step 207. In step 209 the location-based services platform determines if the OS of the mobile device is supported. If the OS is not supported a message is sent to the mobile device and to the site of the unsupported OS for administrative tracking in step 211, and the process ends. A non-limiting exemplary message that may be sent to the mobile device is "We are sorry but your device is not currently supported. A message has been sent to the developers, and we will work to make this service available." If the OS is supported, the service is downloaded in step 213.

Once downloaded, the user enters an email address to create an account to use the secure website connected to the location-based services platform in step 215. Then in step 217 a text a friend message is displayed on the mobile device that asks the user if he would like to text his friends about this service. In the present embodiment, the text a friend feature is built into the software when the user originally downloads the service in step 213; however, alternate embodiments may not comprise a text a friend feature. If the user chooses to text his friends in step 217, the mobile device software automatically extracts the entire list of the contacts in the mobile device and the user is asked to choose which contacts he would like to text or which contacts he would not like to text or let the software text everyone in step 219. The text message informing friends of the user are sent from the users phone directly in step 221. The user is given an incentive to text his friends about the service, for example without limitation, the chance to win a new cell phone. In some embodiments the mobile device software automatically asks the user at a specified interval, for example, without limitation, every 6 weeks, if he would like to text his friends again about the service. In other embodiments, the user is only asked once if he would like to text his friends. In the present embodiment after the contact information is sent in step 221 or if the user chooses not to text his friends in step 217, a message is sent to the mobile device instructing the user to go to his email to activate his account and create a password in step 223. The user is now able to use the services offered by the location-based services platform.

Those skilled in the art, in light of the present teachings, will readily recognize that the steps described in the previous process may be performed in a different order and in some cases steps may be omitted or added. For example, without limitation, some embodiments may not implement a text a friend sequence. Also, the user may be asked to create a password at the same time that the account is created rather than later in the process. In alternative embodiments, the software can be installed to send location data to the server, and the user can interact with the system without setting up a username and password on the web site.

Figure 3:
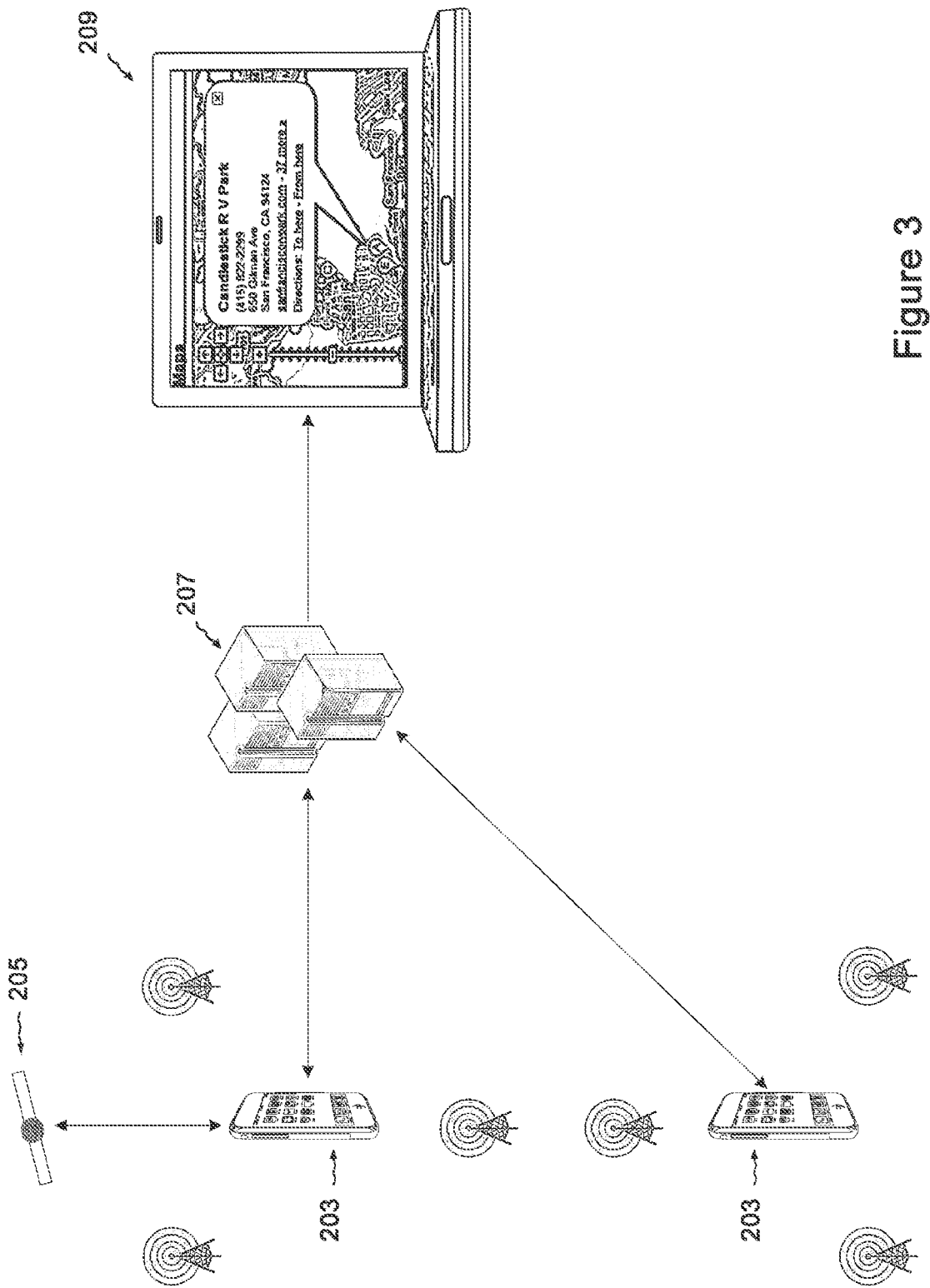
FIG. 3 illustrates an exemplary location-based mobile device locator system, in accordance with an embodiment of the present invention.

FIG. 3 illustrates an exemplary location-based mobile device locator system, in accordance with an embodiment of the present invention. Users of the system will be provided with a tremendous convenience of locating and recovering their mobile device quickly with all of its contacts, pictures, calendars and information rather than waiting for an insurance company to replace the device after several days with none of the information or buying a new device for full price. In the present embodiment, a mobile device 203 is located using GPS 205 since, in the U.S., every cell phone produced after 2006 is required to be GPS enabled. The preferred method of getting the location data is through GPS satellite. When that is not available, the system will utilize cell phone tower triangulation. Software on mobile device 203 sends its location information to a datacenter 207 at a configurable interval. In a preferred embodiment, the software on the mobile device will not send the location to the server if it has not changed. When it does change, the software begins sending the location at the interval specified. This generally reduces bandwidth, and server and database processing. In the present embodiment, mobile device 203 is tracked every 5-30 seconds; however, various different intervals may be used in alternate embodiments. In the present embodiment, the software on mobile device 203 that sends location data to datacenter 207 runs in the background on mobile device 203, and location data is continuously sent to datacenter 207 even if the application is turned off on mobile device 203.

Datacenter 207 comprises servers and databases, and the location data of mobile device 203 is stored in a central database in datacenter 207 in a proprietary and secure fashion. Datacenter 207 is integrated with a third party mapping service such as, but not limited to, Google Maps, MSFT Maps, Navteq or Telenav so that the location of mobile device 203 can be viewed via a map on a secure website 209. In order to use website 209, the user must enter a username and a password. The user may perform various functions on website 209 including, without limitation, creating, editing or suspending a profile, locating a mobile device, paying for services, accessing functions on the mobile device, etc. In some embodiments of the present invention, the consumer is provided with the ability to activate the key-lock feature on the phone from the web site, back up data (e.g., automatically or from the web site), and erase information on the phone.

In typical use of the present embodiment when a user thinks they have lost or had their mobile device 203 stolen, the user logs onto secure website 209 with a unique password to view the location of mobile device 203 on a map similar to a map on MapQuest. If someone has stolen mobile device 203 and replaced the SIM card, the phone number of the new SIM card is shown on website 209. The owner of mobile device 203 then has the number of the thief and may report this information to the police. If the battery of mobile device 203 dies or of someone tampers with the operating system or firmware of mobile device 203, the software of mobile device 203 sends its current location at that exact second to datacenter 207. In the present embodiment, the owner can also activate a key lock feature on mobile device 203, erase all private or personal data, place a phone call, take a picture, video or voice recording and email or MMS message this information to any email address or phone number from secure website 209. Alternate embodiments may be implemented only to track mobile devices and may not enable users to access functions on the mobile device.

In order to offer privacy to users, website 209 and datacenter 207 in the present embodiment are in a secured environment where only the true owner of mobile device 203 is able to view its location. When the location is viewed, an email is sent to the user and a text message is sent to mobile device 203 later, for example, without limitation, 36 hours later. If the user was not the person who viewed the location, the user can change their password, etc. to generally prevent further unauthorized use. Furthermore, a list of the last ten location views of mobile device 203 is listed on website 209 so the user is aware if someone else has viewed their location.

Mobile device locator systems according to preferred embodiments of the present invention have the ability to lower telecommunications costs for consumers and increase their level of satisfaction and retention with carriers by helping to locate mobile devices that would have otherwise been lost. These systems may also be a revenue generator and cost savings application for insurers and carriers. The present embodiment targets primarily users with higher end cell phones or smartphones and personal digital assistants (PDAs) as these users will not only be concerned with the financial loss of the mobile device but also with the loss of personal information on which they rely day to day. However, any person with a cell phone has the potential of being a user of the present embodiment.

Similar to the mobile device locator service described by way of example in accordance with FIG. 3, some embodiments of the present invention may also include a friend and family locator service. Users of this service can view the geographical locations of their friends and family members on a website or on a map on their mobile device. In the present embodiment, this service can be turned on or off completely or the user can select which friends or family members can or cannot see their location. The user can also set the software to send an alert to their mobile device if a friend or family member is within a certain distance from them. This distance can be set on the website or on the user's mobile device. In various embodiments, users can also:
1. view friends location on the web site or from the handset;
2. decide if some, all or none of your friends can see you;
3. share photos that are tagged to a location;
4. recommend places, etc. to friends;

5. For location friends, your location it attached to the message when you send messages or photos; and
6. View friends journals to see the log of what they have been doing and be able to leave comments.

In the present embodiment, after software installation and account activation, the location of each mobile device signed up for the service is sent to a server and central database, similarly to the datacenter described by way of example in accordance with FIG. 3, where the location information is stored. The software that sends location data to the server and central database runs in the background on the mobile device even if the user has turned off the service. In contrast, prior art friend and family locator services require an application to be running in the foreground of the device, and if location sharing is turned off completely or is not used for a specified period of time, the current location information is removed from the system and location updating is suspended. In the present embodiment, even though a user may turn the service off completely or block certain friends and family members, the mobile device continues to send the location of the mobile device to the server and central database. Also, this system can run in the background of the mobile device undetected and does not require an application to be opened on the mobile device to send the location data. Furthermore, the service in the present embodiment sends location information to the server and central database every 5-30 seconds, which is more frequently than the prior art, and stores historical data in the central database to be used later for location-based services as described by way of example in accordance with FIG. 1. The mobile device software in the present embodiment will also only send the location data when it has changed alleviating bandwidth, server and database load. In alternate embodiments, the mobile device may send location information to the server and central database at different intervals.

Along with the proliferation of mobile devices that are GPS enabled, the mobile social networking market is also huge. Therefore, a friend and family locater service according to the present embodiment may be integrated with dating sites such as, but not limited to, match.com, social networking sites such as, but not limited to, myspace.com and facebook.com or a standalone system. In the standalone system, the family and friend locator service can be used and administered at the mobile device or the website of the lost/phone locator embodiment. Users of a friend and family locator service integrated with a social networking system or a standalone system can perform various functions such as, but not limited to, commenting on or posting pictures and videos on certain locations to leave behind for friends or family members, meeting people with similar interests in nearby locations, etc.

In some embodiments of the friend and family locator a business mode is provided whereby the family and friend locator would allow the user to control personal and/or business mode to be on or off. With the business mode enabled, the user could know if a business associate or a non-personal person of interest is near by.

In still other embodiments, the mobile device software may be installed on handheld gaming systems a service could provide location dependent games. Users of the mobile device or handheld gaming system could engage in games such as, but not limited to, games adapted to a geographical area and interactive games between other users in proximity to the user.

In yet other embodiments of the present invention, a location based emergency service is provided where a user can push a panic/emergency button and the system server looks for other users near by that can help. In some related embodiments a "health emergency" button is provided that prompts the server to search for other users that are doctors near the user and send an alert to the doctor (or other emergency service providers) and instructs them on how find (e.g., walked to) the other user in need of first aid or immediate medical until emergency services arrive. It is contemplated that such services might be offered on an opt-in basis, possibly as a good Samaritan service.

Figure 4:
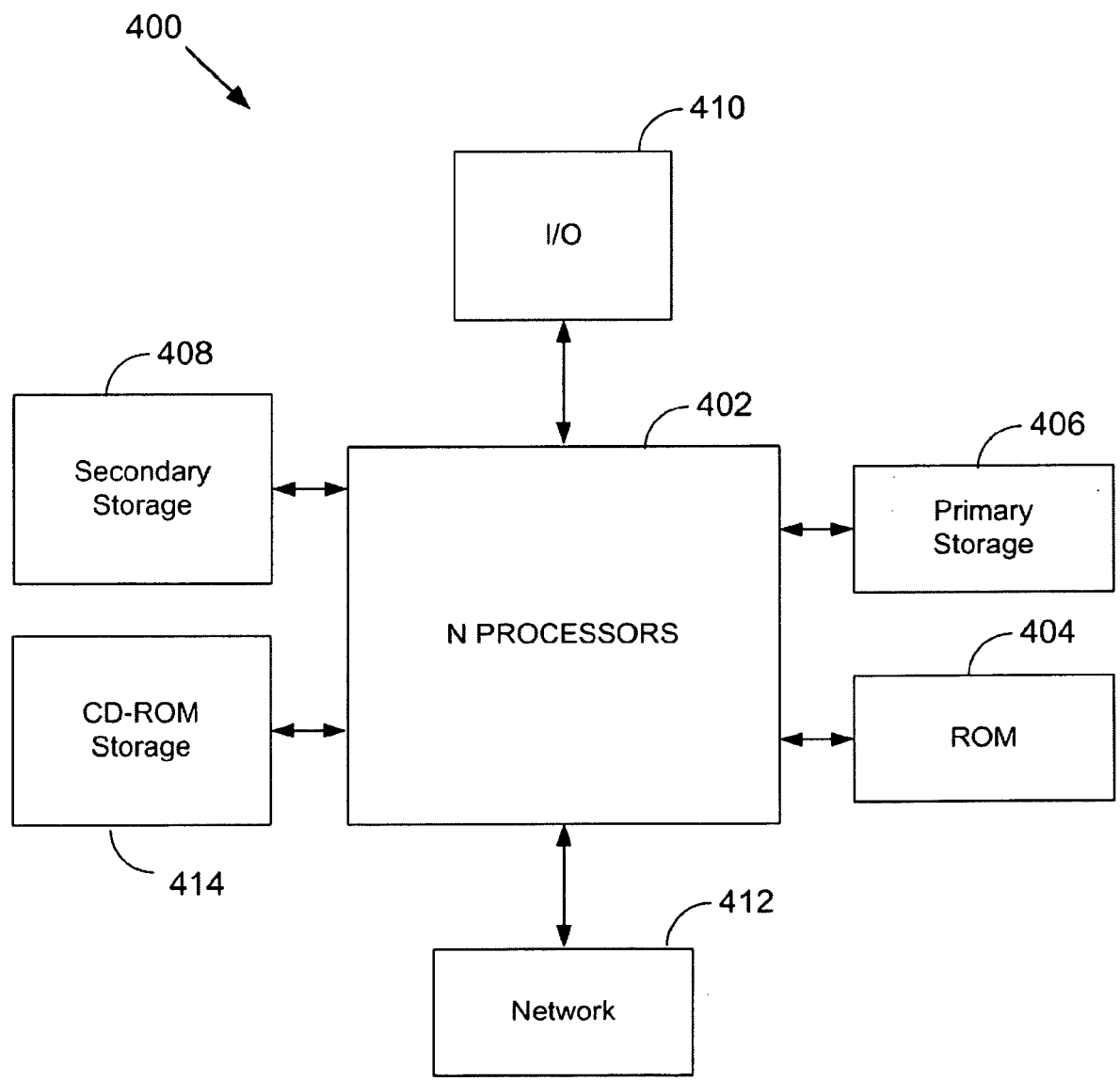
FIG. 4 illustrates a typical computer system that, when appropriately configured or designed, can serve as a computer system in which the invention may be embodied.

FIG. 4 illustrates a typical computer system that, when appropriately configured or designed, can serve as a computer system in which the invention may be embodied. The computer system 400 includes any number of processors 402 (also referred to as central processing units, or CPUs) that are coupled to storage devices including primary storage 406 (typically a random access memory, or RAM), primary storage 404 (typically a read only memory, or ROM). CPU 402 may be of various types including microcontrollers (e.g., with embedded RAM/ROM) and microprocessors such as programmable devices (e.g., RISC or SISC based, or CPLDs and FPGAs) and unprogrammable devices such as gate array ASICs or general purpose microprocessors. As is well known in the art, primary storage 404 acts to transfer data and instructions uni-directionally to the CPU and primary storage 406 is used typically to transfer data and instructions in a bi-directional manner. Both of these primary storage devices may include any suitable computer-readable media such as those described above. A mass storage device 408 may also be coupled bi-directionally to CPU 402 and provides additional data storage capacity and may include any of the computer-readable media described above. Mass storage device 408 may be used to store programs, data and the like and is typically a secondary storage medium such as a hard disk. It will be appreciated that the information retained within the mass storage device 408, may, in appropriate cases, be incorporated in standard fashion as part of primary storage 406 as virtual memory. A specific mass storage device such as a CD-ROM 414 may also pass data uni-directionally to the CPU.

CPU 402 may also be coupled to an interface 410 that connects to one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 402 optionally may be coupled to an external device such as a database or a computer or telecommunications or internet network using an external connection as shown generally at 412, which may be implemented as a hardwired or wireless communications link using suitable conventional technologies. With such a connection, it is contemplated that the CPU might receive information from the network, or might output information to the network in the course of performing the method steps described in the teachings of the present invention.

Those skilled in the art will readily recognize, in accordance with the teachings of the present invention, that any of the foregoing steps and/or system modules may be suitably replaced, reordered, removed and additional steps and/or system modules may be inserted depending upon the needs of the particular application, and that the systems of the foregoing embodiments may be implemented using any of a wide variety of suitable processes and system modules, and is not limited to any particular computer hardware, software, middleware, firmware, microcode and the like.

It will be further apparent to those skilled in the art that at least a portion of the novel method steps and/or system components of the present invention may be practiced and/or located in location(s) possibly outside the jurisdiction of the United States of America (USA), whereby it will be accordingly readily recognized that at least a subset of the novel method steps and/or system components in the foregoing embodiments must be practiced within the jurisdiction of the USA for the benefit of an entity therein or to achieve an object of the present invention. Thus, some alternate embodiments of the present invention may be configured to comprise a smaller subset of the foregoing novel means for and/or steps described that the applications designer will selectively decide, depending upon the practical considerations of the particular implementation, to carry out and/or locate within the jurisdiction of the USA. For any claims construction of the following claims that are construed under 35 USC §112(6) it is intended that the corresponding means for and/or steps for carrying out the claimed function also include those embodiments, and equivalents, as contemplated above that implement at least some novel aspects and objects of the present invention in the jurisdiction of the USA. For example, the databases and location based services may be performed and/or located outside of the jurisdiction of the USA while the remaining method steps and/or system components of the forgoing embodiments are typically required to be located/performed in the US for practical considerations.

Having fully described at least one embodiment of the present invention, other equivalent or alternative methods of providing location-based services as mobile applications according to the present invention will be apparent to those skilled in the art. The invention has been described above by way of illustration, and the specific embodiments disclosed are not intended to limit the invention to the particular forms disclosed. For example, the particular implementation of the location-based services may vary depending upon the particular type of device used. The devices described in the foregoing were directed to cell phone and PDA implementations; however, similar techniques are to provide location-based services to other types of devices such as, but not limited to, automobiles, notebook computers, handheld electronic games, navigation systems, desktop computers, etc. Implementations of the present invention made for devices other than cell phones and PDAs are contemplated as within the scope of the present invention. The invention is thus to cover all modifications, equivalents, and alternatives falling within the spirit and scope of the following claims.

What is claimed is:

1. A method for operating a server computing device, the method comprising:
receiving, at the server, a geographical location of a mobile device, wherein the geographical location of the mobile device is monitored in a background mode of the mobile device;
storing the received geographical location of the mobile device in a database;
receiving login information from a user;
authenticating the user using the received login information;
sending, in response to a request from the user via a secure website, the geographical location of the mobile device stored on the database;
receiving a request from via the secure website to lock a keyboard of the mobile device; and
transmitting instructions to the mobile device, at the received geographical location, to execute the request.

2. The method of claim 1, the method further comprising:
receiving a geographical location of the mobile device that is transmitted from the mobile device upon occurrence of at least one predetermined event.

3. The method of claim 2, the method further comprising:
wherein a first predetermined event comprises a battery power level receding to or less than a predetermined threshold.

4. The method of claim 1, the method further comprising:
receiving a request from the user via the secure website to erase data stored on the mobile device; and
transmitting instructions to the mobile device to erase data stored on the mobile device.

5. The method of claim 1, the method further comprising:
receiving a request from the user via the secure website to erase personal data stored on the mobile device; and
transmitting instructions to the mobile device to erase the personal data stored on the mobile device.

6. The method of claim 1, the method further comprising:
receiving a request from the user via the secure website to backup data stored on the mobile device; and
transmitting instructions to the mobile device to transmit data stored on the mobile device.

7. The method of claim 1, the method further comprising:
sending, in response to a request from the user via a secure website, data restoration instructions to the mobile device.

8. The method of claim 1, the method further comprising:
receiving a request from the user via the secure website to copy data stored on the mobile device; and
transmitting instructions to the mobile device to transmit information associated with stored data on the mobile device for subsequent storage.

9. The method of claim 7, the method further comprising:
bypassing audio settings of the mobile device; and
sending, in response to a request from the user via a secure website, instructions to control audio output of the mobile device.

10. A system comprising: a mobile device, and a server having at least one processing unit; a memory, operatively connected to the at least one processing unit and storing instructions that, when executed by the at least one processing unit, cause the at least one processing unit to perform a method, the method comprising:
receiving at the server, based upon an event, a geographical location of the mobile device that is transmitted from the mobile device having been monitored in a background mode of the mobile device;
storing the geographical location of the mobile device in a database;
receiving login information from a user;
authenticating the user using the received login information;
sending, in response to a request from the user via a secure website, the geographical location of the mobile device stored on the database for display to the user via the secure website;
receiving an indication from the user that the mobile device has been physically dispossessed from the user, wherein the indication comprises instructions to remotely control at least one function of the mobile device;
receiving a request from the user to remotely control the mobile device via the secure website, wherein the request comprises at least one of disabling a keyboard of the mobile device, accessing personal data stored on the mobile device, recording an image, and recording audio; and
transmitting instructions to the mobile device at the received geographical location to execute the request.

11. The system of claim 10, the method further comprising:
receiving a request from the user via the secure website to erase personal data stored on the mobile device; and
transmitting instructions to the mobile device to erase the personal data stored on the mobile device.

12. The method of claim 10, the method further comprising:
receiving a request from the user via the secure website to erase personal data stored on the mobile device; and
transmitting instructions to the mobile device to erase the personal data stored on the mobile device.

13. In a computing environment, a computer-implemented method for location based services utilizing a mobile device and a server, the method comprising:
receiving, at the server, based upon an event, a geographical location of the mobile device, wherein the geographical location is monitored in a background mode of the mobile device;
storing the geographical location of the mobile device in a database of the server;
receiving login information from a user;
authenticating the user using the received login information;
sending, in response to a request from a user via a secure website, the geographical location of the mobile device stored on the database for display to the user via the secure website;
receiving an indication from the user that the mobile device has been physically dispossessed from the user, wherein the indication comprises instructions to remotely control at least one function of the mobile device;
receiving a request from the user to remotely control the mobile device via the secure website, wherein the request comprises at least one of disabling a keyboard of the mobile device, accessing personal data stored on the mobile device, recording an image, and recording audio; and
transmitting instructions to the mobile device at the geographical location to execute the request upon receipt of the request via the secure website.

14. The method of claim 13, further comprising:
suspending transmitting of said geographical location by the mobile device when a geographical location is unchanged from a previous geographical location; and
resuming transmitting of said geographical location when said geographical location is changed from said previous geographical location.

15. The method of claim 13, further comprising: detecting a change in identity of the mobile device and transmitting said change in identity and a current geographical location upon said detection.

16. The method of claim 13, further comprising:
detecting a battery depletion in the mobile device;
detecting attempts to tamper with the mobile device; and
transmitting a current geographical location upon said detection of battery depletion or said detection of attempts to tamper.

17. The method of claim 13, further comprising: receiving a geographical location of the mobile device that is transmitted from the mobile device upon a change to firmware of the mobile device.

18. The method of claim 13, further comprising:
receiving an indication from the user that the mobile device has been physically dispossessed from the user, wherein the indication comprises instructions to remotely control at least one function of the mobile device; and
enabling the user to disable the keyboard of the mobile device, erase personal data, execute a phone call, record an image, and record audio based upon the indication.

19. The method of claim 13, further comprising:
backing up user information stored on the mobile device on the database.

20. A computer program product for location based services utilizing a mobile device, a server, and a secure website, the computer program product comprising a non-transitory computer readable storage medium having a computer program of instructions for executing a computer-implemented method, the method comprising:
intermittently receiving, at the server, a geographical location of a mobile device, wherein the geographical location of the mobile device is monitored in a background mode of the mobile device;
wherein the geographical location of the mobile device is received based upon a battery power level of the mobile device;
storing the geographical location of the mobile device in a database of the server;
receiving login information from a user;
authenticating the user using the received login information;
sending, in response to a request from a user via the secure website, the geographical location of the mobile device stored on the database;
receiving a request from the user to remotely control the mobile device via the secure website, wherein the request comprises at least one of disabling a keyboard of the mobile device, accessing personal data stored on the mobile device, producing tactile feedback; and
transmitting instructions to the mobile device at the geographical location to execute the request upon receipt of the request via the secure website.

21. The method of claim 20, further comprising:
receiving a request from the user via the secure website to erase personal data stored on the mobile device; and
transmitting instructions to the mobile device to erase the personal data stored on the mobile device.

22. A non-transitory computer storage medium storing a computer program of instructions for executing a computer-implemented method among a mobile device, a server, and a secure website, the method comprising:
receiving, at the server, a geographical location of the mobile device, wherein the geographical location of the mobile device is monitored in a background mode of the mobile device;
wherein the geographical location of the mobile device is received based upon a battery power level of the mobile device;
storing the geographical location of the mobile device in a database of the server;
receiving login information from a user;
authenticating the user using the received login information;
sending, in response to a request from a user via a secure website, the geographical location of the mobile device stored on the database;
receiving a request from the user to remotely control the mobile device via the secure website, wherein the request comprises at least one of disabling a keyboard of the mobile device, and erasing data stored on the mobile device; and
transmitting instructions to the mobile device at the geographical location to execute the request upon receipt of the request via the secure website.

23. The method of claim 22, further comprising:
receiving a request from the user via the secure website to erase personal data stored on the mobile device; and
transmitting instructions to the mobile device to erase the personal data stored on the mobile device.

24. The method of claim 1, further comprising:
receiving an indication from the user that the mobile device has been physically dispossessed from the user, wherein the indication comprises instructions to remotely control at least one function of the mobile device; and
enabling the user to disable the keyboard of the mobile device, erase personal data, execute a phone call, record an image, and record audio based upon the indication.

25. The method of claim 24, further comprising:
providing geographical information associated with contacts of a social networking system.

26. The method of claim 13, wherein the secured website is configured to perform at least one function on the mobile devices including activating a key lock feature, erase data, backing up information from the mobile device to the database, placing a phone call, taking a picture, video recording, voice recording, and sending an MMS message.

27. The method of claim 22, further comprising:
receiving an indication from the user that the mobile device has been physically dispossessed from the user, wherein the indication comprises instructions to remotely control at least one function of the mobile device; and
enabling the user to disable the keyboard of the mobile device, erase personal data, execute a phone call, record an image, and record audio based upon the indication.

28. The method of claim 24, further comprising:
receiving an indication from the user that the mobile device has been physically dispossessed from the user, wherein the indication comprises instructions to remotely control at least one function of the mobile device; and
enabling the user to disable the keyboard of the mobile device, erase personal data, execute a phone call, record an image, and record audio based upon the indication.

* * * * *

UNITED STATES PATENT AND TRADEMARK OFFICE
CERTIFICATE OF CORRECTION

| | | |
|---|---|---|
| PATENT NO. | : 8,494,560 B2 | Page 1 of 1 |
| APPLICATION NO. | : 12/362697 | |
| DATED | : July 23, 2013 | |
| INVENTOR(S) | : Lansing Arthur Parker | |

It is certified that error appears in the above-identified patent and that said Letters Patent is hereby corrected as shown below:

In the claims

Column 15, line 60

Delete "via"

Signed and Sealed this
Eleventh Day of February, 2014

Michelle K. Lee
*Deputy Director of the United States Patent and Trademark Office*